United States Patent
Chen

(10) Patent No.: US 8,322,498 B2
(45) Date of Patent: Dec. 4, 2012

(54) SHOCK ABSORBER

(75) Inventor: Song-Ya Chen, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 149 days.

(21) Appl. No.: 12/912,771

(22) Filed: Oct. 27, 2010

(65) Prior Publication Data

US 2012/0037468 A1 Feb. 16, 2012

(30) Foreign Application Priority Data

Aug. 16, 2010 (CN) .......................... 2010 1 0254241

(51) Int. Cl.
*F16F 15/03* (2006.01)
(52) U.S. Cl. ..................................... 188/267; 188/267.2
(58) Field of Classification Search .................. 188/267, 188/267.2
See application file for complete search history.

(56) References Cited

U.S. PATENT DOCUMENTS

| | | | |
|---|---|---|---|
| 6,427,813 B1* | 8/2002 | Carlson | 188/267.2 |
| 6,464,051 B2* | 10/2002 | Lisenker et al. | 188/267.2 |
| 7,628,256 B2* | 12/2009 | Krefeld | 188/282.1 |
| 7,775,333 B2* | 8/2010 | Or et al. | 188/267.2 |
| 2006/0260891 A1* | 11/2006 | Kruckemeyer et al. | 188/267.2 |
| 2010/0181879 A1* | 7/2010 | Lee et al. | 310/75 R |

* cited by examiner

*Primary Examiner* — Robert A Siconolfi
*Assistant Examiner* — Mariano Sy
(74) *Attorney, Agent, or Firm* — Altis Law Group, Inc.

(57) ABSTRACT

A shock absorber includes a cylinder, at least two magnetic blocks, and a connection rod. The cylinder includes a first end, an opposite second end defining a slide hole, and absorption particles are filled in the slide hole. The at least two magnetic blocks are fit in the slide hole and the proximate end surfaces of two adjacent magnetic block have the same magnetism. The connection rod includes a flange portion and a rod portion. The flange portion defines a receiving hole for receiving one of the at least two magnetic blocks.

4 Claims, 3 Drawing Sheets

SHOCK ABSORBER

BACKGROUND

1. Technical Field

The present disclosure relates to a shock absorber.

2. Description of the Related Art

Shock absorbers are important parts of automobile and motorcycle suspensions, aircraft landing gear, and the supports for many industrial machines. There are several types of commonly-used shock absorbers. Though conventional shock absorbers satisfy basic requirements, a new type of absorber is still needed.

BRIEF DESCRIPTION OF THE DRAWINGS

The components of the drawings are not necessarily drawn to scale, the emphasis instead being placed upon clearly illustrating the principles of a shock absorber. Moreover, in the drawings, like reference numerals designate corresponding parts throughout several views.

DETAILED DESCRIPTION

Figure 1:
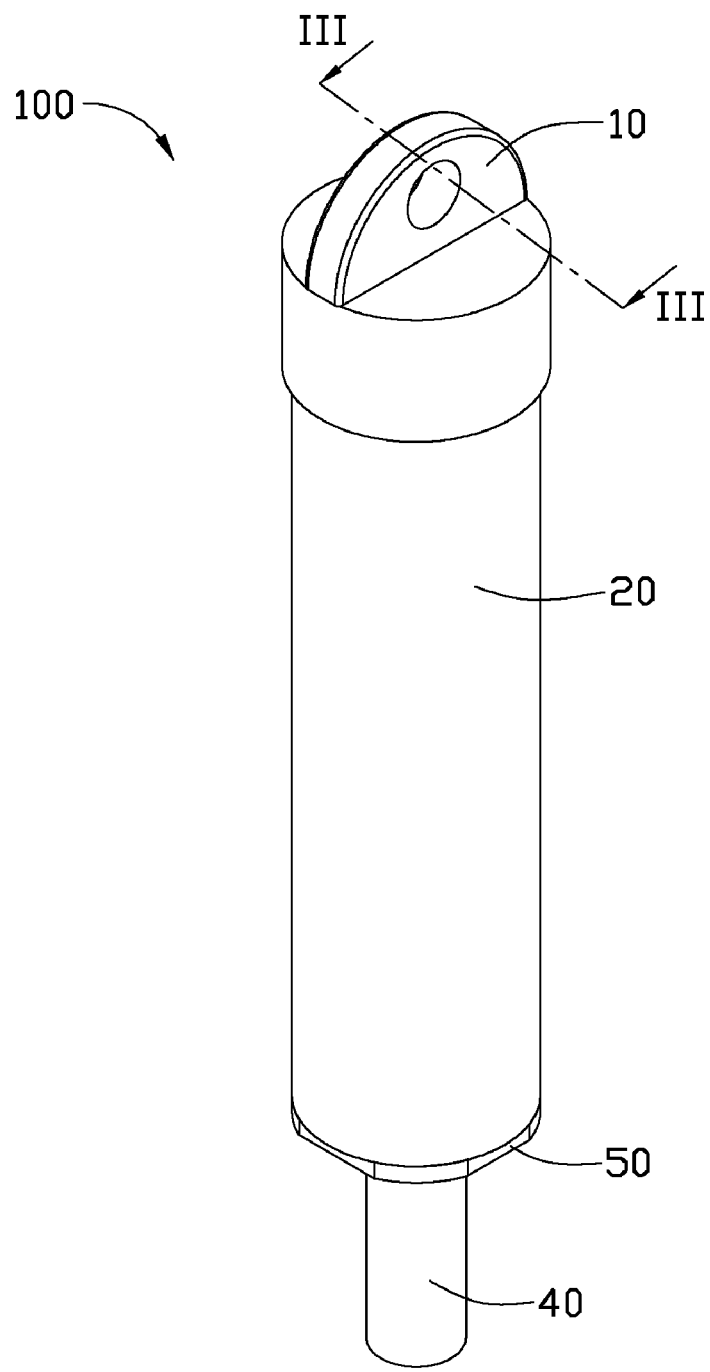
FIG. 1 is an isometric view of a shock absorber according to an exemplary embodiment.
Figure 2:
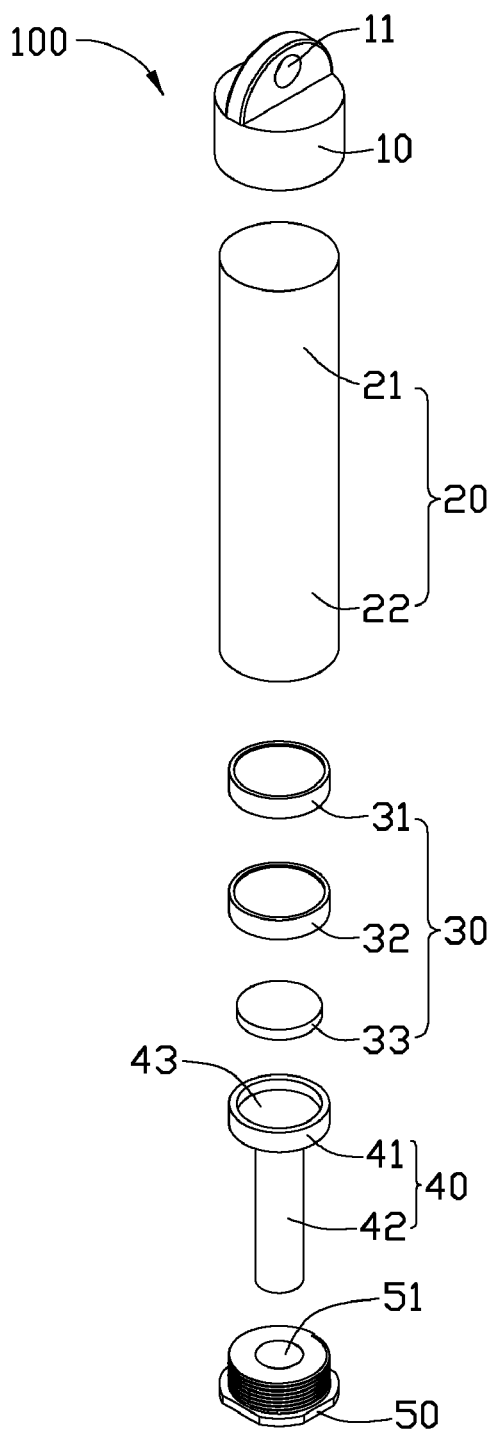
FIG. 2 is an exploded, isometric view of the shock absorber of FIG. 1.

Referring to FIGS. 1 and 2, a shock absorber 100 according to an exemplary embodiment is illustrated. The shock absorber 100 includes a mount member 10, a cylinder 20, at least two magnetic blocks 30, a connection rod 40, and a cap 50.

The cylinder 20 includes a first end 21 and an opposite second end 22 that defines a slide hole 23. A number of absorption particles 24, e.g. hydraulic oil, are filled into the slide hole 23.

The mount member 10 is fixed to the first end 21 of the cylinder 20. The mount member 10 defines a mount hole 11.

The at least two magnetic blocks 30 are matched with the slide hole 23 so that the proximate end surfaces of two adjacent magnetic block have the same magnetism. The at least two magnetic blocks 30 are slidably fit in the slide hole 23 and divide the slide hole 23 into at least two working spaces 230. In the embodiment, the at least two magnetic blocks 30 includes a first block 31, a second block 32, and a third block 33

The connection rod 40 includes a flange portion 41 and a rod portion 42 connected to each other. The flange portion 41 defines a receiving hole 43 for fitting of the third block 33. The cap 50 is fixed to the second end 22 to prevent the at least two magnetic blocks 30 from disengaging form the slide hole 23. The cap 50 defines a through hole 51 aligned with the slide hole 23. The diameter of the through hole 51 is slightly greater than that of the rod portion 42 of the connection rod 40. After assembly, the rod portion 42 extends through the through hole 51.

Figure 3:
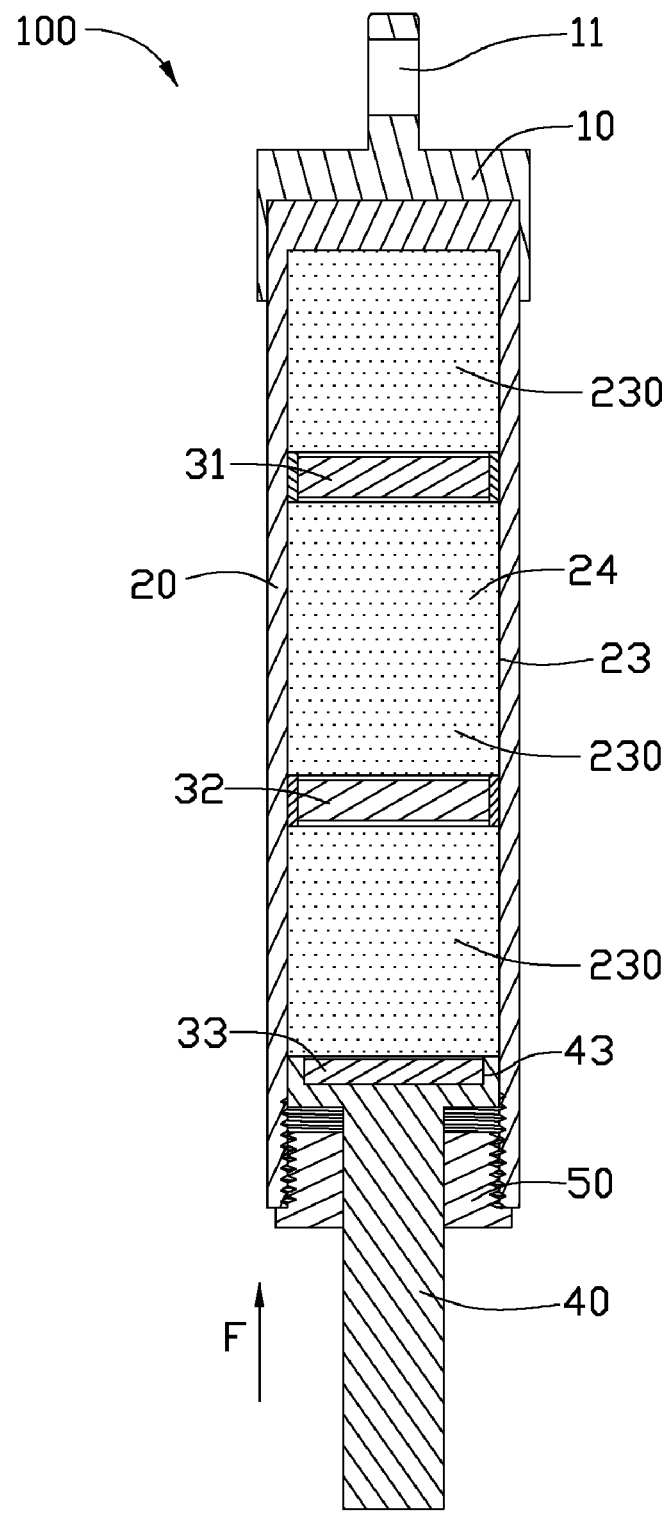
FIG. 3 is a cross section view of the shock absorber of FIG. 1, taken along the line III-III of FIG. 1.

Referring to FIG. 3, a cross section view of the shock absorber of FIG. 1, taken along the line III-III of FIG. 1 is illustrated. When in use, the mount member 10 and the connection rod 40 are connected to two parts, e.g. bicycle frame, and bicycle saddle. When an upward force F is applied to the two parts, the magnetic force between two adjacent magnetic blocks 30 and the absorption particles 24 collectively drive the at least two magnetic blocks 30 to move to a balanced position under the drive of the force F. Thus, the shock absorber 100 absorbs energy of the force F.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A shock absorber comprising:
   a cylinder comprising a first end and an opposite second end defining a slide hole, wherein a-plurality of absorption particles is filled into the slide hole;
   at least two magnetic blocks slidably fit in the slide hole and dividing the slide hole into at least two working spaces sealed from each other, wherein the proximate end surfaces of two adjacent magnetic blocks have the same magnetism; and
   a connection rod comprising a flange portion and a rod portion, wherein the flange portion defines a receiving hole for receiving one of the at least two magnetic blocks, wherein when a force is applied to the cylinder or the connection rod, the magnetic force between the at least two adjacent magnetic blocks and the plurality of absorption particles collectively drive the at least two magnetic blocks to move to a balanced position.

2. The shock absorber as described in claim 1, wherein the at least two magnetic blocks comprises a first block, a second block, and a third block orderly fitted into the slide hole of the cylinder.

3. The shock absorber as described in claim 1, further comprising a mount member fixed to the first end of cylinder.

4. The shock absorber as described in claim 1, further comprising a cap fixed to the second end of the cylinder and defining a through hole for the rod portion extending through.

* * * * *